(12) United States Patent
Pournaghi et al.

(10) Patent No.: US 10,185,877 B2
(45) Date of Patent: Jan. 22, 2019

(54) SYSTEMS, PROCESSES AND DEVICES FOR OCCLUSION DETECTION FOR VIDEO-BASED OBJECT TRACKING

(71) Applicants: Reza Pournaghi, Markham (CA); Rui Zhang, Aurora (CA)

(72) Inventors: Reza Pournaghi, Markham (CA); Rui Zhang, Aurora (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 195 days.

(21) Appl. No.: 15/205,680

(22) Filed: Jul. 8, 2016

(65) Prior Publication Data

US 2018/0012078 A1    Jan. 11, 2018

(51) Int. Cl.
| | |
|---|---|
| *G06K 9/00* | (2006.01) |
| *G06K 9/62* | (2006.01) |
| *G06T 7/00* | (2017.01) |
| *G06T 7/20* | (2017.01) |
| *G06T 7/246* | (2017.01) |

(52) U.S. Cl.
CPC ..... *G06K 9/00771* (2013.01); *G06K 9/00718* (2013.01); *G06K 9/6212* (2013.01); *G06T 7/0048* (2013.01); *G06T 7/0051* (2013.01); *G06T 7/2066* (2013.01); *G06T 7/2093* (2013.01); *G06T 7/246* (2017.01); *G06T 2207/10016* (2013.01); *G06T 2207/10024* (2013.01); *G06T 2207/10028* (2013.01); *G06T 2207/20072* (2013.01); *G06T 2207/20076* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 2003/0165268 A1 | 9/2003 | Franz | |
| 2008/0166045 A1* | 7/2008 | Xu | G06K 9/00771 |
| | | | 382/170 |

(Continued)

FOREIGN PATENT DOCUMENTS

| | | |
|---|---|---|
| CN | 104240235 A | 12/2014 |
| CN | 104539899 A | 4/2015 |

(Continued)

OTHER PUBLICATIONS

Color histogram, https://en.wikipedia.org/wiki/Color_histogram.

(Continued)

*Primary Examiner* — Weiwen Yang
(74) *Attorney, Agent, or Firm* — Norton Rose Fulbright Canada LLP

(57) ABSTRACT

Processes, systems, and devices for occlusion detection for video-based object tracking (VBOT) are described herein. Embodiments process video frames to compute histogram data and depth level data for the object to detect a subset of video frames for occlusion events and generate output data that identifies each video frame of the subset of video frames for the occlusion events. Threshold measurement values are used to attempt to reduce or eliminate false positives to increase processing efficiency.

24 Claims, 13 Drawing Sheets

(56) References Cited

U.S. PATENT DOCUMENTS

| | | | | |
|---|---|---|---|---|
| 2009/0010490 A1* | 1/2009 | Wang | ............... | G06K 9/00771 |
| | | | | 382/103 |
| 2014/0347475 A1* | 11/2014 | Divakaran | ......... | G06K 9/00771 |
| | | | | 348/135 |
| 2017/0241774 A9* | 8/2017 | Brandli | ................. | G01B 11/25 |
| 2017/0344832 A1* | 11/2017 | Leung | ............... | G06K 9/00771 |

FOREIGN PATENT DOCUMENTS

| | | |
|---|---|---|
| CN | 104657993 A | 5/2015 |
| CN | 104866830 A | 8/2015 |
| EP | 1330132 A2 | 7/2003 |

OTHER PUBLICATIONS

Ashutosh Saxena, Min Sun, Andrew Y. Ng, "Learning 3-D Scene Structure from a Single Still Image", In ICCV workshop on 3D Representation for Recognition (3dRR-07), 2007.

Priyanka Mekala, Rodrigo J.Salmeron, Jeffrey Fan, Asad Davari, Jichang Tan, "Occlusion Detection Using Motion-Position Analysis", 42nd South Eastern Symposium on System Theory University of Texas at Tyler Tyler, TX, USA, Mar. 7-9, 2010.

Alper Yilmaz, Xin Li, and Mubarak Shah, "Contour-Based Object Tracking with Occlusion Handling in Video Acquired Using Mobile Cameras", IEEE Transactions on Pattern Analysis and Machine Intelligence, vol. 26, No. 11, Nov. 2004.

* cited by examiner

SYSTEMS, PROCESSES AND DEVICES FOR OCCLUSION DETECTION FOR VIDEO-BASED OBJECT TRACKING

FIELD

The improvements generally relate to the field of video processing, and in particular, to occlusion detection for video-based object tracking.

INTRODUCTION

Video surveillance is a technology with social impact in the area of public safety. Conventional surveillance systems may not support real-time decision-making because a large amount of surveillance video data needs to be manually reviewed by a human operator. There is a need for efficient and effective automated video surveillance.

SUMMARY

In accordance with one aspect, there is provided a process for occlusion detection for video-based object tracking (VBOT). The process involves processing at least one first video frame to compute first histogram data and first depth level data for an object of the at least one first video frame. The process involves processing a second video frame to compute second histogram data and second depth level data for the object. The process involves determining that the second video frame contains an occlusion of the object by comparing the first histogram data and second histogram data and the first depth level data and the second depth level data. The process further involves transmitting output data that indicates the second video frame that contains the occlusion of the object.

In some embodiments, the process involves processing the at least one first video frame to compute the first histogram data by detecting the object, defining a Region of Interest (ROI) for the object, and computing the first histogram data using the ROI for the object.

In some embodiments, the process involves comparing the first histogram data and second histogram data by computing a histogram variation and comparing the histogram variation to a histogram threshold measurement value.

In some embodiments, the process involves computing the histogram variation by determining a similarity of two histogram vectors for each of the first histogram data and second histogram data, the histogram vector representing a distribution of color values of the pixels for the video frame or a Region of Interest (ROI) for the object of the video frame.

In some embodiments, the first depth level data is computed by processing a Region of Interest (ROI) or expanded ROI for the object to compute depth level values for pixels of the ROI or expanded ROI, the depth level data based on the depth level values for the pixels.

In some embodiments, the process involves comparing the first depth level data and the second depth level data by computing a depth variation and comparing the depth variation to a depth threshold measurement value.

In some embodiments, the process involves determining that the histogram variation is greater than the histogram threshold measurement value; comparing the first depth level data and the second depth level data to compute a depth level variation; and comparing the depth variation to a depth threshold measurement value to determine that the second video frame contains the occlusion of the object.

In some embodiments, the process involves updating an average histogram value based on the first histogram data and second histogram data. The histogram threshold measurement value can be based on the average histogram value.

In some embodiments, the depth level data is a value that indicates a closeness of the object to a camera for the second video frame. In some embodiments, the depth level data is a value that indicates a depth order for the object and other objects in the second video frame based on the closeness of the object or the other objects to the camera.

In some embodiments, the process involves tracking the object by defining a Region of Interest (ROI) of the object in each of the at least one first video frame and the second video frame and computing the first histogram data and the second histogram data using the ROIs of the object.

In some embodiments, the process involves processing an expanded ROI based on the ROI of the object in each of the at least one first video frame and the second video frame and computing the first depth level data for the object and the second depth level data for the object by estimating a depth-level value based on the expanded ROIs of the object.

In some embodiments, the output data comprises an index for the second video frame or a copy of the second video frame.

In accordance with another aspect, there is provided a device for occlusion detection for video-based object tracking (VBOT). The device has a transceiver receiving video frames for tracking an object. The device has a processor configured to process at least one first video frame to compute first histogram data and first depth level data for an object of the at least one first video frame. The processor is configured to process a second video frame to compute second histogram data and second depth level data for the object. The processor is configured to determine that the second video frame contains an occlusion of the object by comparing the first histogram data and second histogram data and the first depth level data and the second depth level data. The processor is configured to generate output data that indicates that the second video frame contains the occlusion of the object. The device has a data storage device for storing the output data.

In some embodiments, the processor is configured to process the at least one first video frame to compute the first histogram data by detecting the object and defining a Region of Interest (ROI) for the object, and compute the first histogram data using the ROI for the object.

In some embodiments, the processor is configured to compare the first histogram data and second histogram data by computing a histogram variation and comparing the histogram variation to a histogram threshold measurement value.

In some embodiments, the processor is configured to compute the histogram variation by determining a similarity of two histogram vectors for each of the first histogram data and second histogram data, the histogram vector representing a distribution of color values of the pixels for the video frame or a Region of Interest (ROI) for the object of the video frame.

In some embodiments, the processor is configured to compute the first depth level data by processing a Region of Interest (ROI) or expanded ROI for the object to compute depth level values for the pixels of the ROI or expanded ROI, the depth level data based on the depth level values for the pixels.

In some embodiments, the processor is configured to compare the first depth level data and the second depth level data by computing a depth variation and comparing the depth variation to a depth threshold measurement value.

In some embodiments, the processor is configured to determine that the histogram variation is greater than the histogram threshold measurement value; compare the first depth level data and the second depth level data to compute a depth level variation; and compare the depth variation to a depth threshold measurement value to determine that the second video frame contains the occlusion of the object.

In some embodiments, the processor is configured to update an average histogram value based on the first histogram data and second histogram data, the histogram threshold measurement value being based on the average histogram value.

In some embodiments, the depth level data is a value that indicates a closeness of the object to a camera for the second video frame. In some embodiments, the depth level data is a value that indicates a depth order for the object and other objects in the second video frame based on the closeness of the object or the other objects to the camera.

In some embodiments, the processor is configured to track the object by defining a Region of Interest (ROI) of the object in each of the at least one first video frame and the second video frame and computing the first histogram data and the second histogram data using the ROIs of the object.

In some embodiments, the processor is configured to process an expanded ROI based on the ROI of the object in each of the at least one first video frame and the second video frame and computing the first depth level data for the object and second depth level data for the object by estimating a depth-level value based on the expanded ROIs of the object.

In accordance with another aspect, there is provided a system for occlusion detection for video-based object tracking (VBOT). The one or more cameras capture video frames for tracking an object. A processor is configured to process at least one first video frame to compute first histogram data and first depth level data for an object of the at least one first video frame. The processor is configured to process a second video frame to compute second histogram data and second depth level data for the object. The processor is configured to determine that the second video frame contains an occlusion of the object by comparing the first histogram data and second histogram data and the first depth level data and the second depth level data. The processor is configured to generate output data that indicates that the second video frame contains the occlusion of the object. The system has a display device for displaying a visual representation of the output data or the second video frame.

Many further features and combinations thereof concerning embodiments described herein will appear to those skilled in the art following a reading of the instant disclosure.

DESCRIPTION OF THE FIGURES

In the figures.

DETAILED DESCRIPTION

Embodiments described herein provide systems, processes, and devices for occlusion detection for video-based object tracking (VBOT). Intelligent video analytic technologies based on computer vision and machine learning can be used to implement aspects of embodiments described herein. For intelligent video analytic technologies, VBOT processes extract information from video frames of objects of interest. The extracted information is used for ultimate decision-making with respect to an application or a customer use case.

In VBOT, an object being tracked can be fully or partially occluded by another object in a video frame, scene, or portion of the video frame. An object is occluded when the object is not completely visible from the viewpoint of the camera due to another object being between the object and the camera. An example in the context of human body tracking is that a person goes behind another object, and his/her body becomes either fully or partially obstructed from camera view. VBOT uses a representation or modeling of the visual appearance of objects. When an object being tracked is occluded, there can be a considerable amount of variation in the visual appearance of the object, which can lead to an inaccurate representation and erroneous matching against a learned model. In the event of occlusion, VBOT can lose track of one or more occluded objects and start tracking another object or stick to background. This is referred to as an identity switch.

Figure 2:
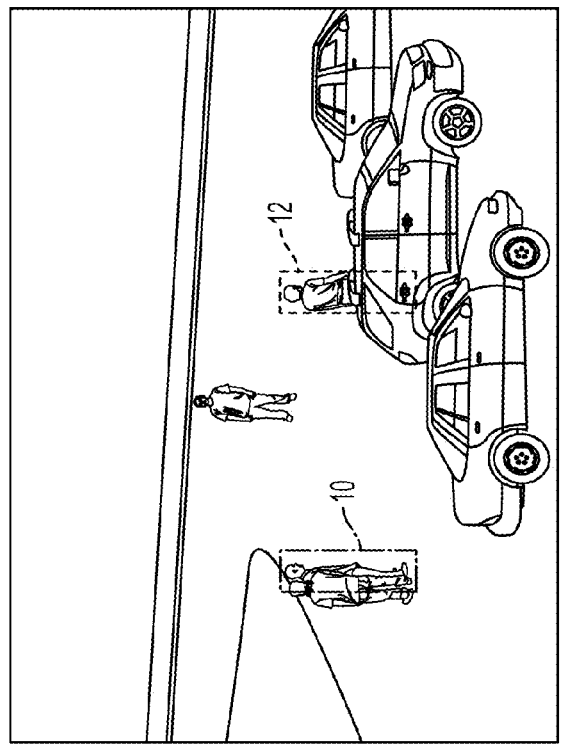
FIG. 2 illustrates an example of a video frame with the two objects to be tracked at second locations.
Figure 1:
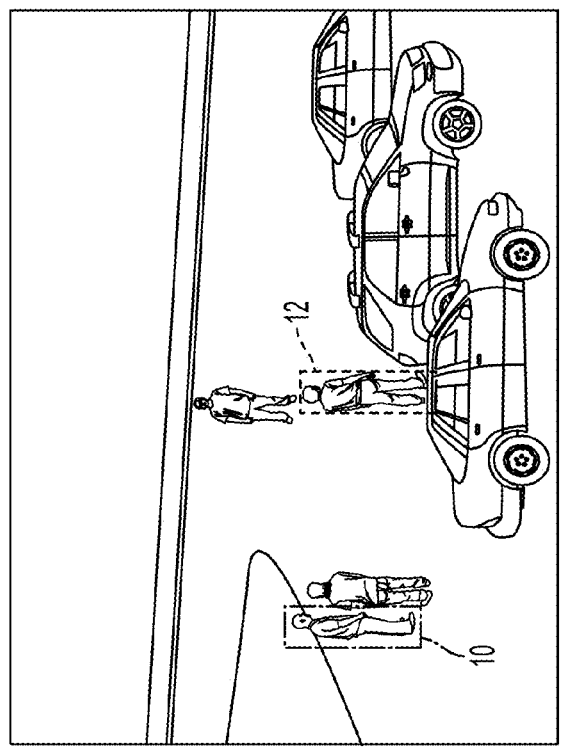
FIG. 1 illustrates an example of a video frame with two objects being tracked at first locations.

FIG. 1 shows an example of a video frame with two objects 10, 12 being tracked at first locations. FIG. 2 shows an example of a video frame with the two objects 10, 12 being tracked at second locations. As shown in FIG. 2, the objects 10, 12 are partially occluded in the second locations. Due to occlusion, an accurate feature representation might not be extracted from the video frames and an incorrect matching of objects over different video frames might be obtained.

Figure 3:
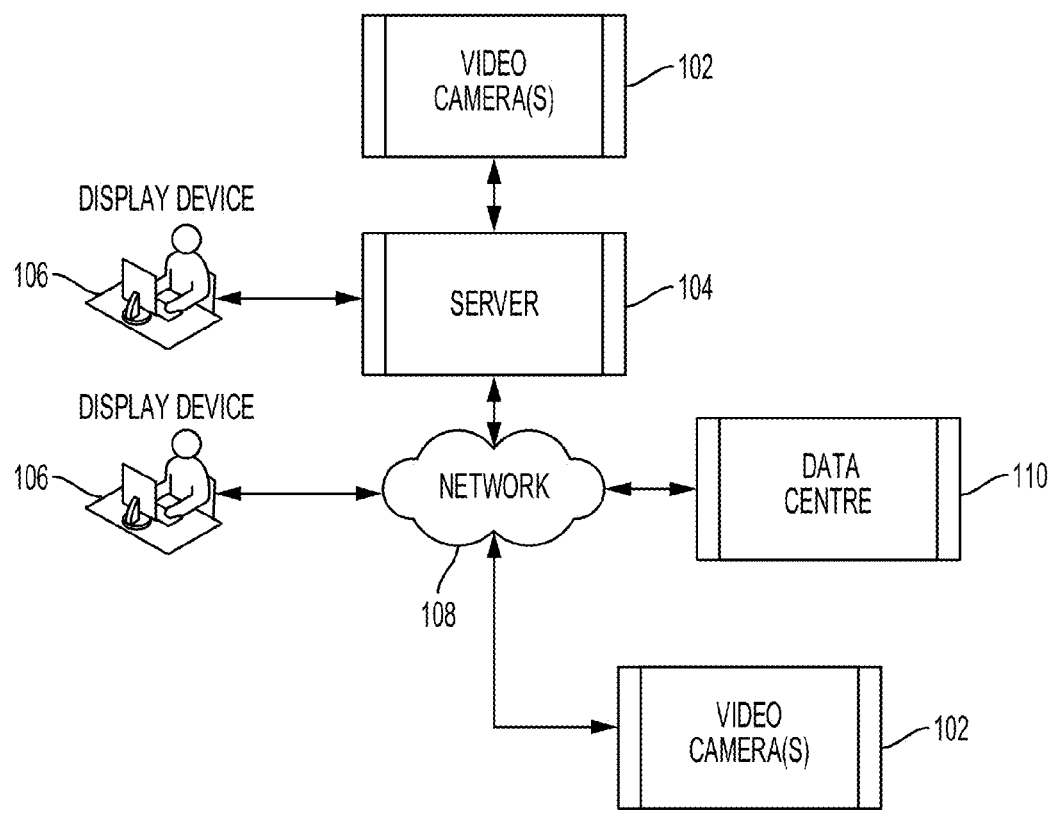
FIG. 3 illustrates an example schematic of a system for occlusion detection for video-based object tracking (VBOT) according to some embodiments.

FIG. 3 shows an example schematic of a system for occlusion detection for VBOT.

In some embodiments, the system is a video surveillance system. The video surveillance system includes a server 104 configured for occlusion detection for VBOT. Although only one server 104 is shown for simplicity of illustration, there can be multiple servers 104 connected or coupled to display device 106, data centre 110 and video cameras 102.

Example embodiments are described herein in relation to video surveillance for illustrative purposes. Other applications or use cases include artificial intelligence, robotics, satellite image processing, medical image processing applications, virtual reality, and augmented reality.

The server 104 receives video data feeds with video frames of objects being tracked. The video frames include one or more occlusion events. The server 104 processes the video frames to determine a subset of video frames with detected occlusion events. The server 104 generates output data that indicates video frames of the subset of video frames for the one or more occlusion events. For example, the output data includes indices for the beginning video frames for the one or more occlusion events. As another example, the output data includes indices for each video frame for the one or more occlusion events. The output data includes a copy of the video frame in some examples. The server 104 processes real-time or near real-time video data feeds and also processes pre-recorded video data feeds. The video data feeds can be from video cameras 102 or data centre 110. The output data includes copies of the video frames, indices of the video frames for the occlusion events, or other indicators for the video frames for the occlusion events. The processing of video frames for occlusion detection is described with reference to the server 104 as an example. In some embodiments, the processing of video frames for occlusion detection is implemented by display device 106, video camera 102, data centre 110, or a combination thereof.

In some embodiments, the server 104 couples to one or more video cameras 102 to receive video data feeds. The video cameras 102 can be a collection of cameras. The video cameras 102 can be the same type of camera device or can be different types of camera devices. The video cameras 102 couple to a hub, router, or other device to collect and aggregate video data feeds for provision to server 104. The video cameras 102 can be located at one or more customer sites to track objects at one or more locations. The video cameras 102 capture real-time or near real-time video data feeds of objects being tracked. The video cameras 102 generate video data feeds of sufficient quality to identify objects within the video frames. Further, the object of interest can be of sufficiently close to one or more video cameras 102. In some embodiments, the server couples to the one or more video cameras 102.

Data centre 110 couples to video cameras 102 to receive and store video data feeds. Data centre 110 contains data storage devices to store raw video data feeds from video cameras 102. Data centre 110 provides a central data repository for server 104, customers or customer sites, for example. In some embodiments, the server 104 receives video data feeds from data centre 110 for processing. In some embodiments, the server 104 transmits the output data to data centre 110 for storage. Data centre 110 contains data storage devices to store the processed output data from server 104 for one or more customers and customer sites. In some embodiments, the server 104 or data centre 110 can be local to one or more video cameras 102. In some embodiments, the data centre 110 and server 104 can be remote from one or more video cameras 102. The data centre 110 can provide cloud computing storage for video data feeds and output data. The server 104 can provide cloud computing processing for video data feeds.

The server 104 transmits the output data, video data feeds, or both to display device 106 for display to a user. The display device 106 includes I/O devices to receive control commands to manipulate video cameras 102 and the capture of video data feeds, for example. The display device 106 also generates and transmits control commands to manipulate the playback of video data feeds, to verify object detection and to provide input in relation to regions of interest in the video frames, for example.

The server 104 connects to other components, for example directly or indirectly via the network 108. Network 108 is capable of carrying data. Network 108 has wired connections, wireless connections or a combination thereof. Network 108 may involve different network communication technologies. Examples include Global System for Mobile Communications (GSM), Code division multiple access (CDMA), wireless local loop, WMAX, Wi-Fi, Bluetooth, Long Term Evolution (LTE), and so on. Network 108 may include different physical media such as, for example, coaxial cable, fiber optics, or base transceiver stations. Example network types include the Internet, Ethernet, plain old telephone service (POTS) line, public switched telephone network (PSTN), integrated services digital network (ISDN), digital subscriber line (DSL), and others, including any combination thereof. Network 108 can be a local area network or wide area network.

Figure 4A:
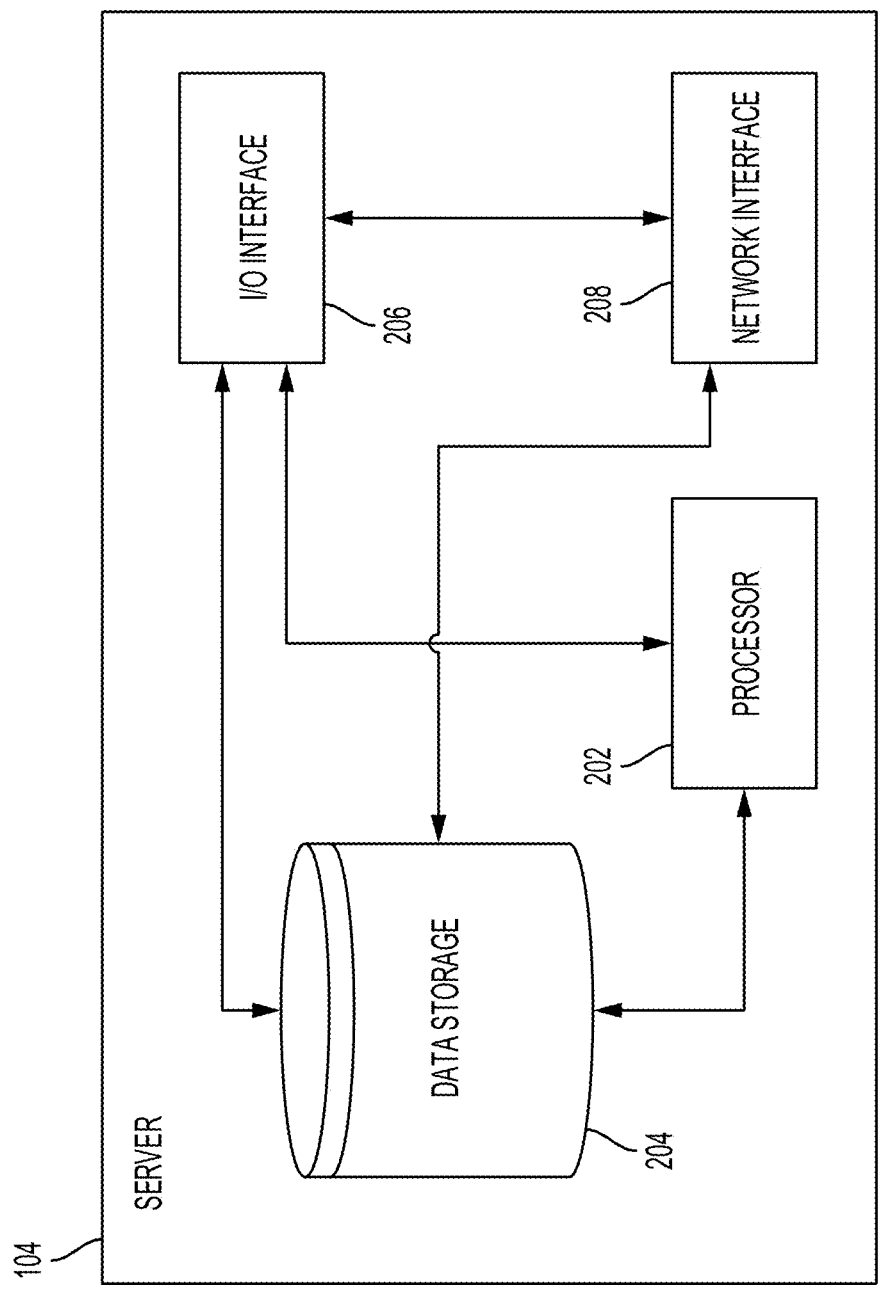
FIG. 4A illustrates a schematic diagram of a server according to an embodiment.

FIG. 4A is a schematic diagram of server 104, according to an embodiment. As depicted, server 104 includes at least one processor 202, memory 204, at least one I/O interface 206, and at least one network interface 208. For simplicity only one server 104 is shown. System can include more servers 104 to receive video data feeds and exchange data with data centre 110 and display device 106. The servers 104 can be the same type of computing device or different types of computing devices. Server 104 implements a video surveillance system as an example application. The processor 202 can execute instructions on memory 204 to implement aspects of the VBOT process.

Each processor 202 can be, for example, a microprocessor or microcontroller, a digital signal processing (DSP) processor, an integrated circuit, a field programmable gate array (FPGA), a reconfigurable processor, or any combination thereof.

Memory 204 includes a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), electrically-erasable programmable read-only memory (EEPROM), Ferroelectric RAM (FRAM) or the like.

I/O interface 206 enables server 104 to interconnect with one or more input devices, such as a keyboard, mouse, camera, sensors, touch screen, or microphone; or with one or more output devices such as a display screen or a speaker. In some embodiments, the I/O interface 206 transmits control commands to control video cameras 102 and the capture of video data feeds, for example. The I/O interface 206 transmits commands to processor 202 to verify object detection and tracking. The I/O interface 206 transmits control commands to processor 202 to enable object selection for tracking, and provide input in relation to ROIs and expanded ROIs in the video frames, for example.

Network interface 208 enables server 104 to communicate with other components, to exchange data with other components, to access and connect to network resources, serve applications, and perform other computing applications by connecting to a network (or multiple networks) capable of carrying data.

Server 104 is operable to register and authenticate users (using a login, unique identifier, and password for example) prior to providing access to video data feeds, output data, applications, a local network, network resources, other networks and network security devices. Server 104 can serve one user, customer or customer site, or multiple users, customers or customer sites.

Figure 4B:
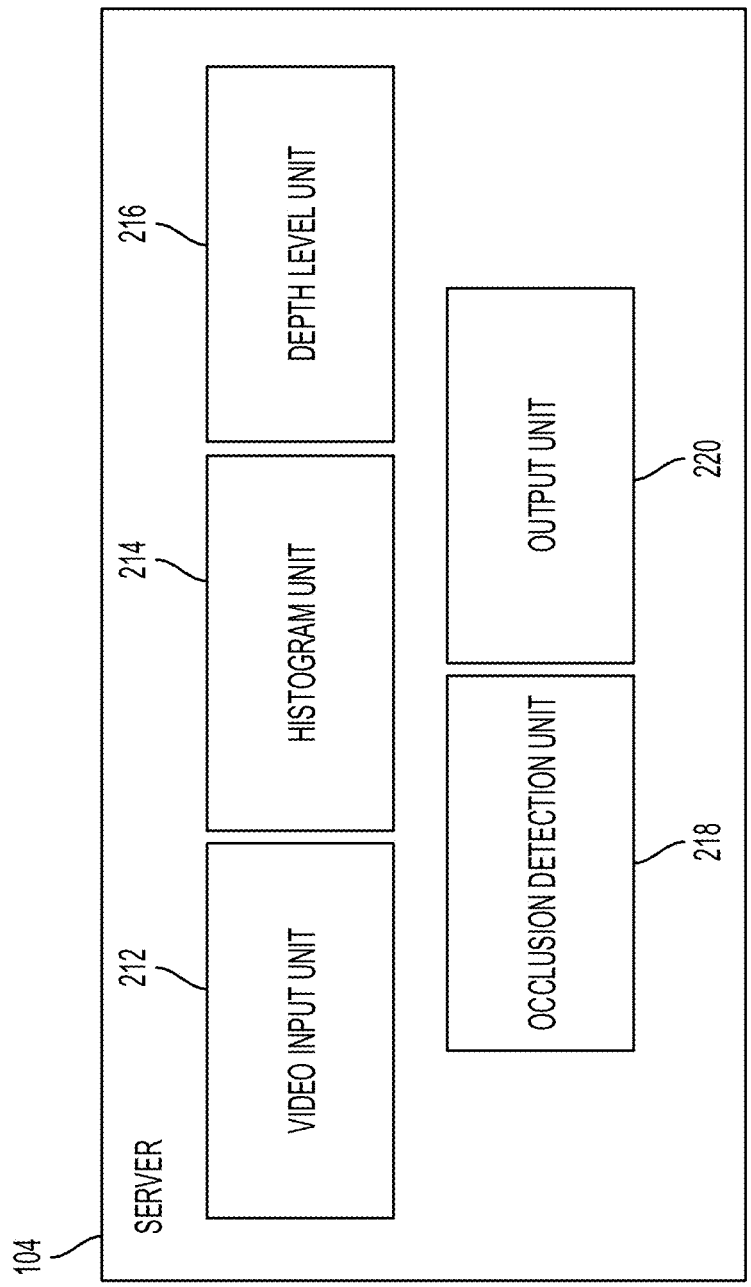
FIG. 4B illustrates a schematic diagram of a server with functional units according to an embodiment.

FIG. 4B is a schematic diagram of server 104 according to an embodiment.

Video input unit 212 receives video frames for tracking an object. The video frames contain an occlusion of the object. The server 104 tracks an object by localizing an ROI of the object in each video frame of a video data feed and associating the ROIs of the object over time and video frames, using computer vision and machine learning techniques, for example.

An ROI is a portion or part of the video frame that includes the object of interest. The ROI provides a boundary around the object of interest such that it tightly includes the object of interest. The ROI can be various shapes, such as the example rectangles shown in FIG. 1 and FIG. 2. The ROI can be the smallest rectangle (or other shape) that includes the entire object of interest present in the video frame. An expanded ROI includes a larger portion of the video frame than the ROI.

Histogram unit 214 processes the video frames to compute histogram data for the object being tracked for occlusion detection. Histogram unit 214 computes histogram data for ROIs of the object in each video frame.

Occlusion detection unit 218 determines a subset of candidate video frames by comparing histogram data for the object being tracked as computed by the histogram unit 214. The candidate video frames have potential occlusion events involving the object being tracked. The candidate video frames can include false positives, which are candidate video frames that are flagged as having a potential occlusion event but do not actually contain an occlusion of the object. By way of example, the ROI of a human body may undergo significant change when the person turns around while moving. In such a situation, although the histogram data can flag a potential occlusion event, the false positive can be filtered by the depth level analysis based on a change in depth not exceeding a threshold, as will be explained below in greater detail.

Occlusion detection unit 218 compares histogram data computed for the ROIs of the object over time to identify histogram variation for the computed histogram data for different video frames. The histogram variation is a threshold difference in histogram data for consecutive, adjacent, or another sequence of video frames. Threshold measurement values are used to reduce or eliminate false positives detected by the histogram variation and the depth level variation.

Depth level unit 216 processes the subset of candidate video frames with potential occlusion events to compute the depth level data for the object being tracked for occlusion detection. For each of the candidate video frames, the depth level unit 216 computes depth level data for the object to filter out false positives from the results of the histogram based analysis. Depth level unit 216 computes depth level data for ROIs or expanded ROIs of the object in each video frame. The depth level processing by depth level unit 216 generally consumes an increased level of processing resources relative to the histogram processing by histogram unit 214. Occlusion detection unit 218 filters out video frames using the histogram data for the object being tracked to generate the set of candidate video frames. The depth level unit 216 preferably only processes the set of candidate video frames flagged using the histogram data. This approach uses processing resources efficiently by reducing the number of video frames processed by the depth level unit 216. Further, threshold measurement values are used to further reduce or filter out video frames as being false positives for further efficient use of processing resources. The threshold measurement values can be received as user configuration or dynamically determined using machine learning techniques.

Occlusion detection unit 218 determines one or more video frames that contain an occlusion of the object from the subset of candidate video frames flagged as having potential occlusions events by the histogram data. Occlusion detection unit 218 compares depth level data computed by the depth level unit 216 for the ROIs or expanded ROIs of the object being tracked to identify depth level variation. The depth level variation is a threshold difference in depth level data for different video frames. Threshold measurement values are used to reduce or eliminate false positives detected by the histogram variation and the depth level variation.

Output unit 220 generates output data that indicate indices or other references to the one or more video frames that contain the occlusion of the object being tracked. The output unit 220 transmits the output data for further processing, retrieval or display. The transmission also includes storage in a data storage device local or remote to server 104.

Figure 5:
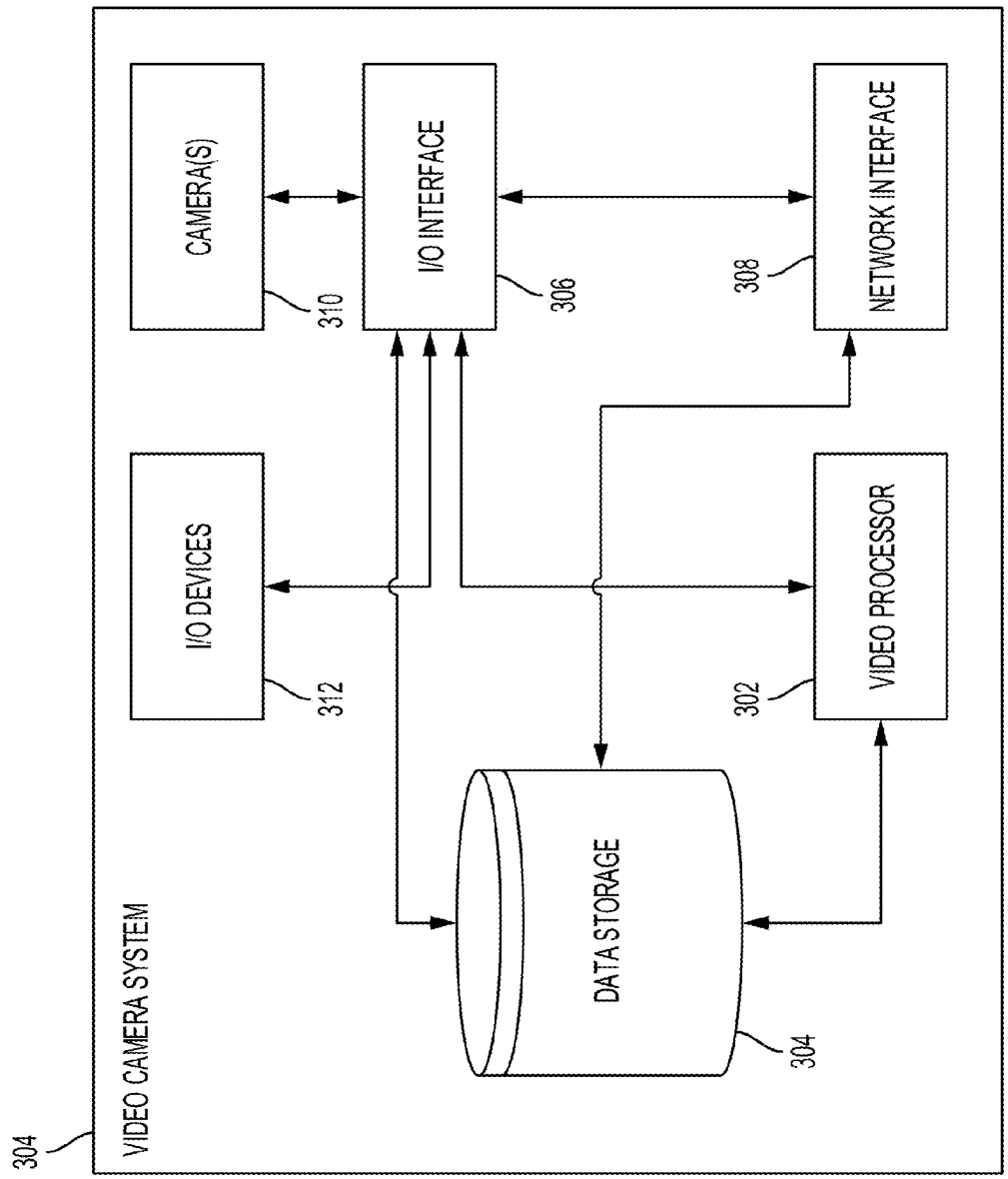
FIG. 5 illustrates a schematic diagram of video camera system according to an embodiment.

FIG. 5 illustrates a diagram of video camera system 304, according to an embodiment. The video camera system 304 includes one or more types of cameras 310 to generate video data feeds for tracking objects. The video data feeds can be in real-time or near real-time. The video camera system 304 can include or integrate with other I/O devices 312 such as sensors, a touch screen, or a microphone; or with one or more output devices such as a display screen or a speaker. The video camera system 304 is a surveillance camera system in some embodiments. In other embodiments, the video camera system 304 processes pre-recorded or real-time video feed for VBOT occlusion detection.

In some embodiments, the video camera system 304 implements aspects of video camera 102 and server 104 of FIG. 3. Video camera system 304 includes video processor 302 which is a device or circuit embedded within video camera 304 to implement the VBOT processes described herein in relation to server 104, for example. In some example embodiments, the video camera 304 (with embedded video processor 302) implements part of the VBOT process and interacts with server 104 (FIG. 3) for the remaining part of the process, particularly for processor intensive operations to offload complex processing jobs.

In some embodiments, the video processor 302 implements aspects of the units shown in FIG. 4B. The video processor 302 receives video frames from cameras 310 or data storage 304. The video frames contain an occlusion of the object. In some example embodiments, the video processor 302 processes the video frames to compute histogram data and depth level data to determine one or more video frames that contain an occlusion of the object. In some example embodiments, the video processor 302 generates output data that identifies the video frames that contain an occlusion of the object. The video processor 302 processes real-time or near real-time video data feeds, or processes pre-recorded video data feeds from video cameras 310 or data storage 304. In some example embodiments, the video processor 302 transmits the output data to data storage 304 for storage. In some example embodiments, video processor 302 transmits video output data to server 104 (FIG. 3) for further processing. The video processor 302 transmits the output data, video data feeds, or both to I/O device 312 for display to a user.

The I/O devices 312 generate control commands to manipulate cameras 310 and the capture of video data feeds, for example. The I/O devices 312 also generate control commands for video processor 302 to manipulate the playback of video data feeds, verify object detection, enable object selection for tracking, and provide input in relation to ROIs and expanded ROIs in the video frames, for example.

As described herein, server 104 (FIG. 3), video camera system 304, or a combination thereof can be configured to implement a VBOT process for occlusion detection by processing video frames to compute histogram data and depth level data to detect a subset of video frames that contain an occlusion of the object being tracked. The histogram data is computed using an ROI for an object being tracked. The depth level data is computed using an expanded ROI for an object being tracked.

Figure 6:
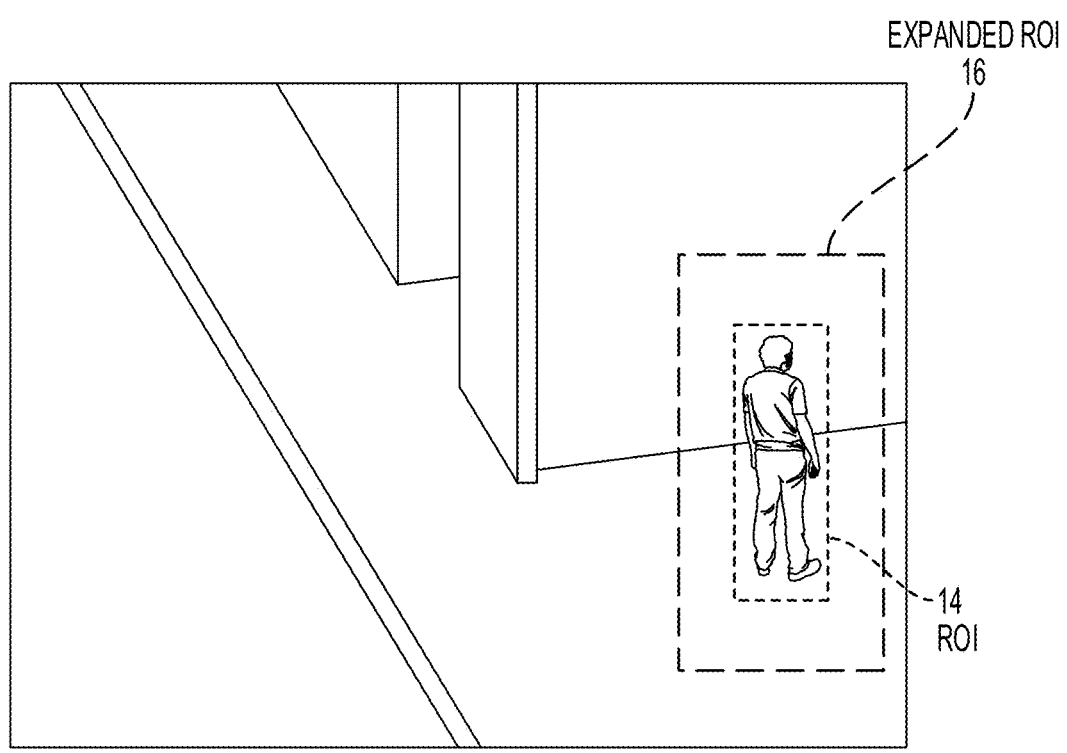
FIG. 6 illustrates a diagram of a region of interest (ROI) for an object being tracked as a portion of a video frame and an expanded ROI for feature extraction for tracking the object in the next frame.

Another example ROI 14 is shown by an inner rectangle 104 surrounding an object in FIG. 6 as an illustrative example. An example expanded ROI 16 is also shown in FIG. 6 by an outer rectangle 106 surrounding the object. The expanded ROI 16 includes the object of interest as well as part of some of the background area surrounding the object. The expanded ROI is used to generate depth level data because it can include other objects that cover or otherwise occlude the object of interest. The expanded ROI is derived from the ROI as a larger portion of the video frame.

Figure 7:
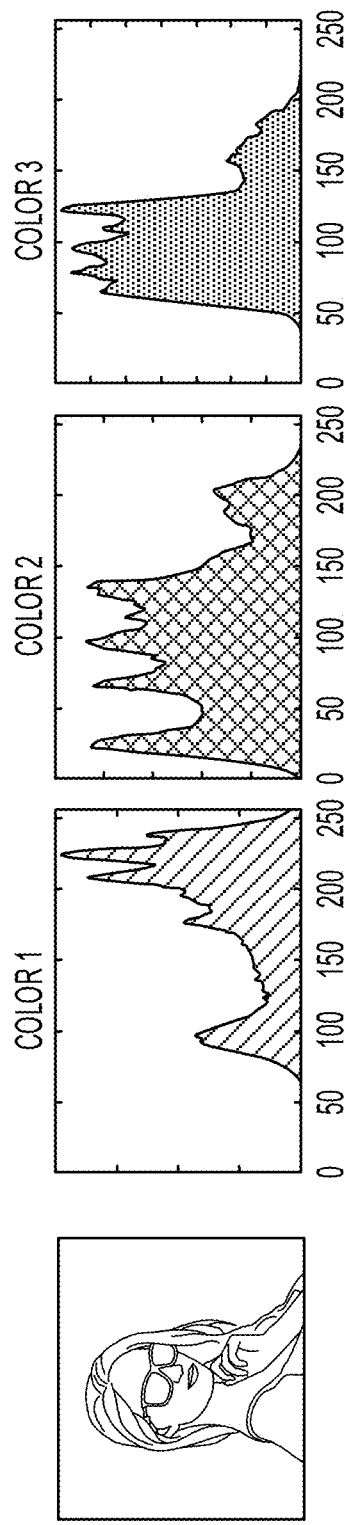
FIG. 7 illustrates a diagram of an example histogram for an ROI for an object being tracked.

In some embodiments, the histogram data includes one or more histogram vectors for the object being tracked. A histogram vector is a representation of the distribution of color or grey scale, intensity, or gradient in an image or video frame. An illustrative example of a histogram is shown in FIG. 7. The similarity or variation between two histograms can be computed using a Histogram Similarity Measurement $\|x-y\|$ that measures similarity of two histograms x and y. A Histogram Similarity Measurement can be a histogram intersection or Kullback-Leibuler Divergence, for example. The Histogram Similarity Measurement can be used to determine a histogram variation by comparing histogram data for consecutive or adjacent video frames to detect changes or differences there between.

Figure 8:
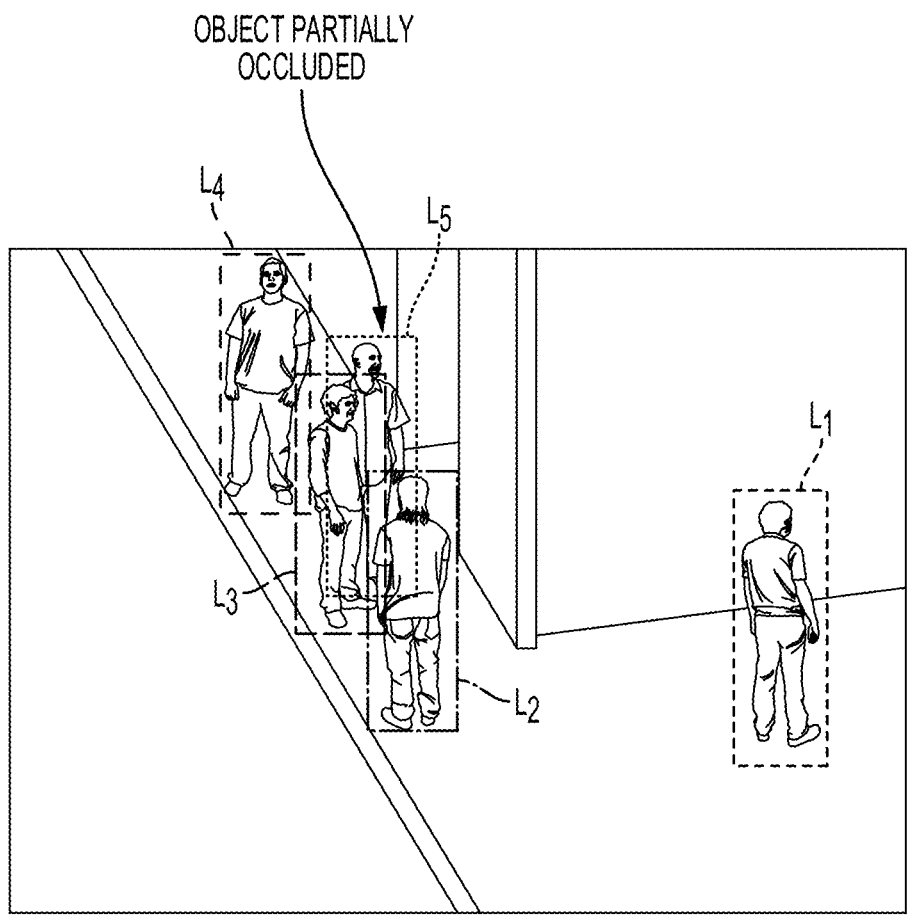
FIG. 8 illustrates a diagram of an example depth level for a partially occluded object being tracked shown within an ROI of the video frame.

A depth-level (L) value indicates the closeness of an object to the camera. For example, the depth-level value can be a positive integer. FIG. 8 shows an illustrative example with five humans as example objects. Each human has a corresponding ROI (or expanded ROI) and depth-level L1, L2, L3, L4, L5. As shown, the depth level of an object is a ranking relative to the depth level of other objects in the video frame to define a depth order, where $L1<L2<L3<L4<L5$. The depth order defines an order of the depth level value of an object relative to other objects in the video frame. FIG. 8 shows an object at depth level L5 that is partially occluded by another object at depth level L3 in the video frame. FIG. 8 also shows the object at depth level L3 partially occluded by another object at depth level L2 in the video frame. A depth level variation can be detected by comparing depth level values for video frames. The depth level variation indicates a reduction or increase in depth level, which can indicate an occlusion event.

VBOT can be implemented in various ways. For example, VBOT can be implemented by designing a visual appearance representation and an object model robust against occlusion. As another example, VBOT can be implemented by detecting occlusion first, and then applying a visual appearance representation explicitly designed for objects with an occluded view.

Embodiments described herein are directed to systems, devices and processes for occlusion detection in VBOT. In particular, embodiments described herein provide systems, devices and processes to find or identify the video frames in a video data feed where some part of an object of interest is invisible or occluded, which are referred to as occlusion events. It should be noted that the view of an object of interest in a video can be occluded several times in an individual video frame or over multiple video frames. Embodiments described herein are used to find an occlusion of an object being tracked.

Figure 9:
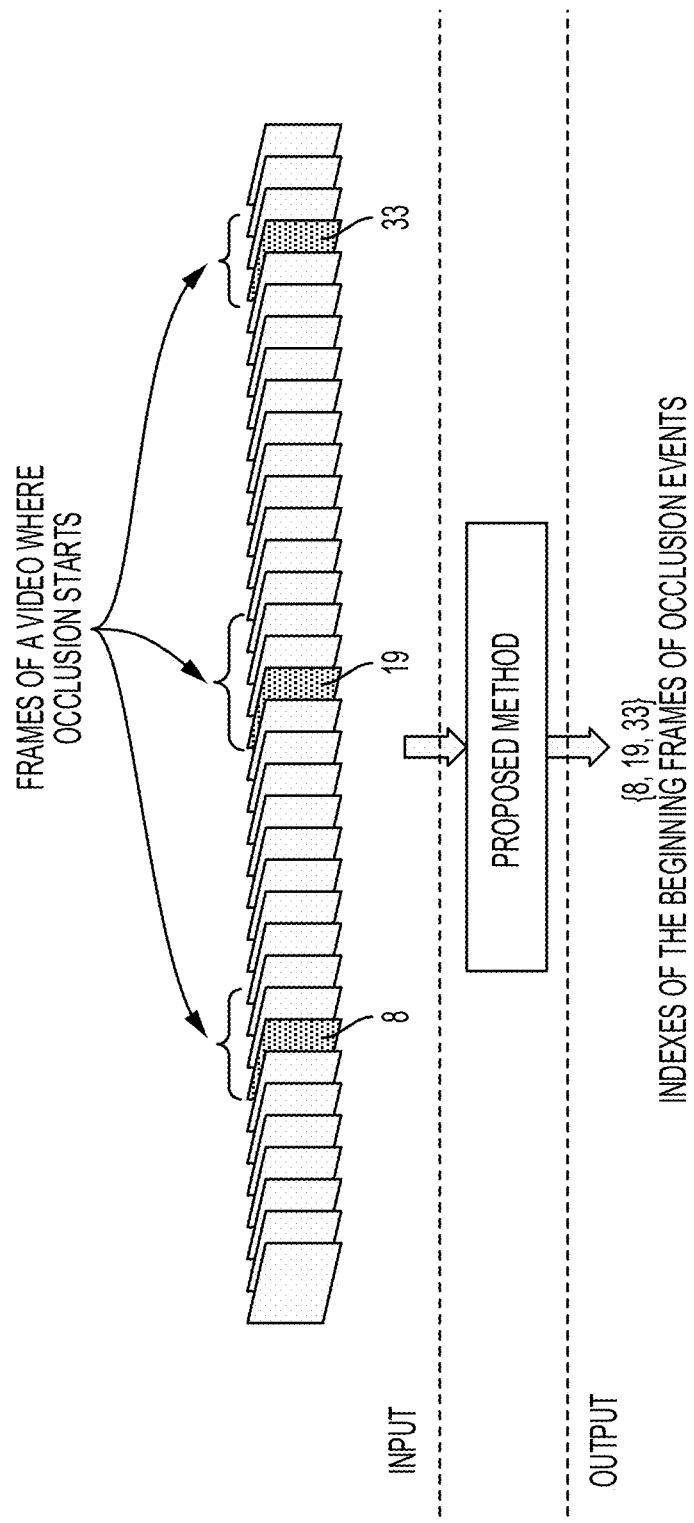
FIG. 9 illustrates a diagram of an example process that receives video frames as input data and generates output data as detected occlusion events and corresponding beginning video frames of such an event.

FIG. 9 provides an example of input data of video frames and output data of a subset of video frames for a detected occlusion of an object being tracked. A detected occlusion of an object being tracked may be referred to as an occlusion event. Input data includes a video data feed of multiple video frames labelled consecutively. The video frames have one or more occlusion events. A particular object of interest is associated with one or more occlusion events over multiple video frames. Embodiments described herein process the video data feed to identify one or more video frames containing an occlusion of the object of interest. As shown, embodiments described herein generate output data identifying the video frames including occlusion events for the object of interest, such as indices of the beginning video frames of the occlusion events or copies of the video frames of the occlusion events.

Figure 10:
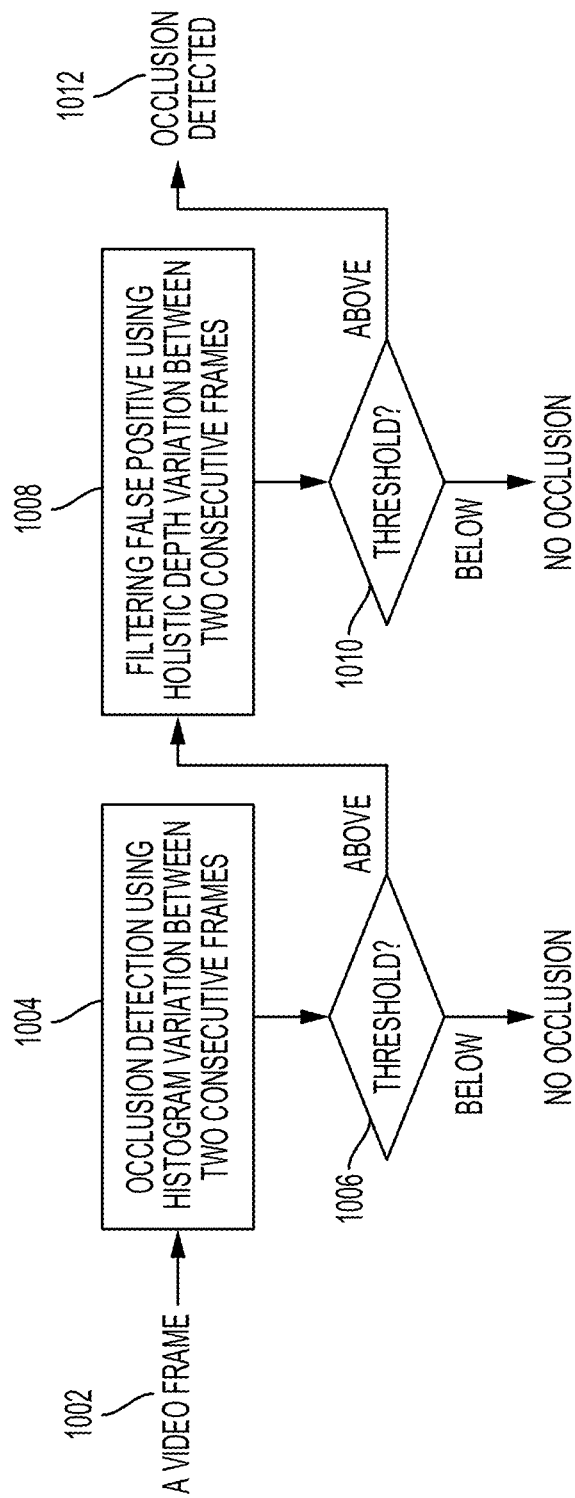
FIG. 10 illustrates a diagram of an example process to detect one or more occlusion events for an object of interest in video frames according to some embodiments.

FIG. 10 shows an example flow chart of a process for occlusion detection. The process includes a two-stage occlusion detection process based on histogram variation and depth level estimation. The example process will be described with reference to FIG. 3 as an illustrative example. As noted, one or more acts can be implemented by video camera system 304 (FIG. 5) or other hardware components in other example embodiments.

At 1002, the server 104 receives video frames from a video data feed generated by video cameras 102. The server 104 starts tracking one or more objects of interest. The acts described herein can be implemented for one or more objects of interest. The server 104 implements a pre-process to identify various objects in the video frames and selects one or more of the identified objects for VBOT.

At 1004, the server 104 processes the video frame to identify one or more occlusion events for an object of interest. The server 104 processes the video frame for occlusion detection using histogram variation between two consecutive video frames. The occlusion detection by server 104 includes an examination of histogram variation of the ROI of each object for potential occlusion detection. The histogram based examination can result in false positives because histogram variation results from events other than occlusion.

At 1006, the server 104 uses a threshold measurement value comparison for the histogram variation to attempt to reduce the number of false positive occlusion events. If the histogram variation falls below the threshold measurement value, the server 104 determines that there are no occlusion events for the object of interest in the video frame. The server 104 calculates the threshold measurement value using various functions or processes. The threshold measurement value can be computed using a user configured or predefined value. The threshold measurement value can be computed automatically using machine learning techniques. For example, the threshold is initially set using a hard coded value for training machine learning processes for an application and video type to reduce false positives (which in turn require processing resources for the depth analysis). The machine learning tunes or adjusts the threshold measurement value. There is a pre-process of training using machine learning to set the threshold measurement value, which can be manually input to a system for the occlusion detection process. The threshold measurement value can be static or dynamic in various example embodiments.

The threshold measurement value can vary depending on the application for the VBOT process and available processing resources. As an example for the histogram threshold measurement value computation, the server 104 receives a set of videos captured by a surveillance camera. The following binary classification process is used to estimate the histogram threshold for the specific surveillance camera. The process extracts ROI of objects of interest from all video frames. The process marks these ROIs as either "occluded" or "not occluded". The process computes histogram similarities of each of these ROIs with respect to one or more previous ROIs using one or more histogram similarity measurement values. In one example, a value between the average histogram similarity measurement value of ROIs in a "not occluded" set and average similarity of ROIs in an "occluded" set is set to be the histogram threshold.

If the histogram variation is above the threshold measurement value, at 1008, the server 104 filters further false positives using depth level variation between consecutive video frames. The relatively more computationally intensive depth-based detection step provides further screening of the candidate video frames (and portions thereof or ROIs) that pass the first examination based on the first threshold measurement value comparison at 1006. That is, server 104 processes fewer video frames at 1008 than at 1004 in order to use resources efficiently.

At 1010, the server 104 uses a depth threshold measurement value comparison for the depth level variation in order to attempt to further reduce false positives for events other than occlusion events. If the depth variation falls above the depth threshold measurement value, at 1012, the server 104 detects the occlusion events for the object of interest in the video frame. There are different kinds of methods for setting the threshold value. One example method is to manually apply a fixed value based on domain knowledge. Another example method is to set the threshold to some value that is automatically estimated using machine learning methods. In the method that uses the machine learning, to the server 104 collects a set of examples labelled with either "occlusion" or "no occlusion". An example is the difference between the depth values of two consecutive video frames from a video data feed. A binary classifier will be learned using such a set of training data and the result can be a decision boundary of the classifier, the two sides of which correspond to occlusion and no occlusion.

Figure 11:
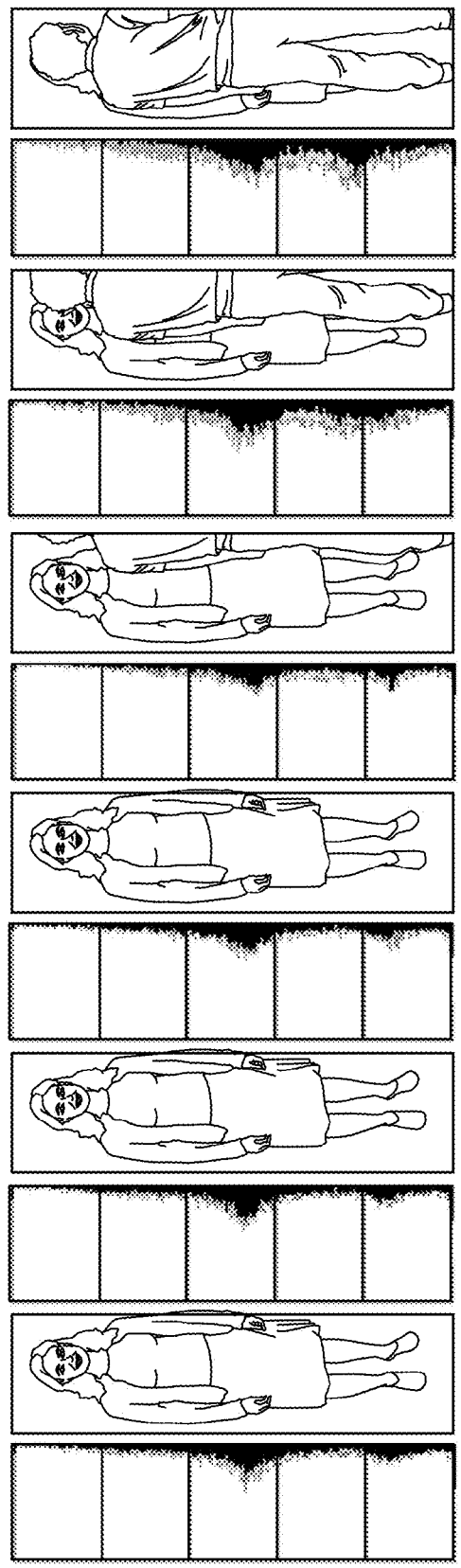
FIG. 11 illustrates histograms of ROI images for an object of interest in video frames.

FIG. 11 shows example histograms of ROI images of video frames. As noted, the server 104 uses histogram variation to detect occlusion events. The server 104 uses computed histogram data of ROI images (from video frames) of the object being tracked to detect occlusion of the object being tracked. For example, the histogram of the ROI images of the object being tracked does not change significantly when there are no occlusion events relating to the object being tracked. However, when the object is masked or otherwise occluded by another object, its histogram data changes.

Server 104 implements different processes to detect histogram variation between histogram data for different video frames (e.g., as computed at 1004 of FIG. 10). For example, the server 104 identifies or defines an object of interest in a video frame of video data feeds. As another example, server 104 receives video data feeds of multiple video frames. Server 104 initializes the video frame number, such as by setting the current video frame index f=1, and sequentially processes received video frames so that the current video frame index "f" increments for each iteration of the process.

If the video frame at index f is not available, then the server 104 stops because this indicates the end of the video data feed, for example. Otherwise, server 104 retrieves an ROI of the object at the current video frame at index f. Server 104 computes the histogram data of the ROI image in the video frame at index f (which is referred to as $h_f$).

If the current video frame at index f is the first video frame of the video data feed (f==1) then server 104 updates the average histogram $H_f$ for the video data feed. In some embodiments, the server 104 does not compute the histogram similarity measurement value for the first video frame given that there is no previous video frame for comparison. In some examples, the server 104 uses another adjacent video frame to compute the average histogram value $H_f$ even if the current video frame is the first video frame. Otherwise (if the current video frame at index f is not the first video frame), the server 104 computes histogram similarity measurement value as $d_f = \|H_{f-1} - h_f\|$. The server 104 implements a threshold measurement value comparison for the histogram similarity measurement value to attempt to eliminate or reduce false positives. If server 104 determines that $d_f$ is less than a threshold measurement value (for histogram similarity), which is referenced as $d_f <$ Threshold, then the server 104 proceeds to compute and update the average histogram value.

If server 104 determines that $d_f$ is greater than or equal to the histogram threshold measurement value, then server 104 flags the video frame as having a potential occlusion event for further processing using the depth variation process described herein. The threshold measurement value for the histogram similarity measurement value can be determined and updated using machine learning techniques for some example embodiments. The threshold measurement value for the histogram similarity measurement value can also be updated using feedback from the machine learning or user input process, such as identification, verification and confirmation of false positives using I/O device, for example.

The server 104 updates the average histogram value $H_f = [(f-1)H_{f-1} + h_f]/f$ and then proceeds to set or increment the video frame to f=f+1. The server 104 then repeats the process for occlusion detection using histogram variation.

Figure 12:
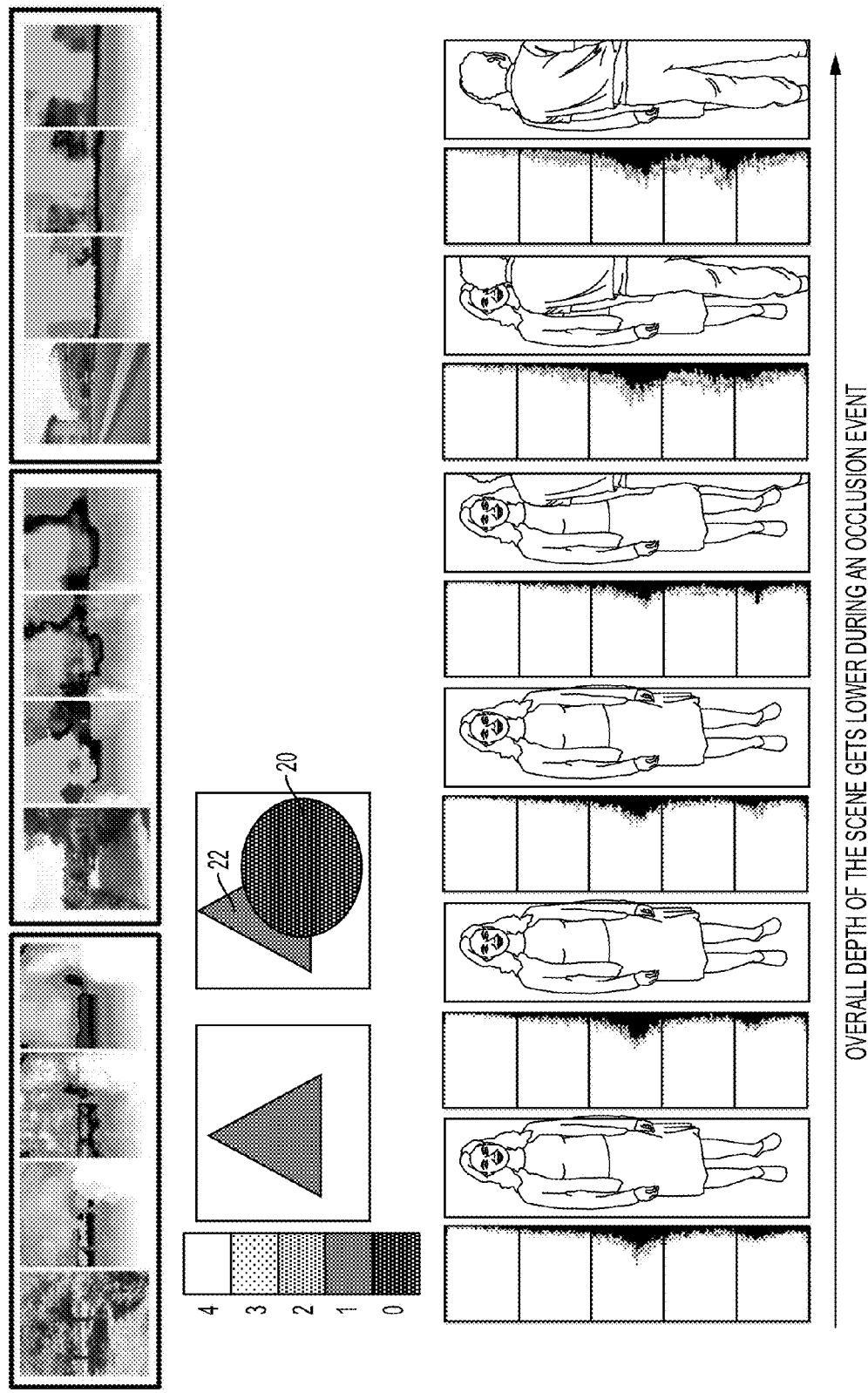
FIG. 12 illustrates a diagram of depth variation for an object of interest in video frames.

FIG. 12 illustrates a diagram of depth variation for an object of interest in video frames.

The server 104 can use a monocular image or video frame to estimate depth of objects in a scene, ROI or expanded ROI. The server 104 generates a depth map for the video frame and a sequence of video frames. The server 104 defines metrics for different scales or colors of an image or video frame. The example illustrates a legend with a scale of shades, such that the darker shades start at a depth level value of 0 and range to lighter shades at a depth level value of 4. For this example embodiment, the overall depth level value of an object in a scene, ROI, or expanded ROI of a video frame might be lower when an occlusion event occurs. There is a different object that appears in front of the object being tracked in a darker shade with an associated lower depth level value based on the legend with the scale. That is, a video frame has an object that is closer to the camera than the object being tracked. Each pixel of the expanded ROI for an object can be evaluated using the legend with the scale shown to generate a depth level value for all pixels of the expanded ROI. The depth level value is used to detect the occlusion events for the video frame being processed. The server 104 computes depth variation using a comparison of depth values for consecutive or adjacent images. A reduction in depth level values from one video frame to the previous video frame indicates a potential occlusion event. A depth value can be a relative value between an object and the camera. For example, a depth value is a value for the distance between the object and the camera. The depth value is greater when the object is farther away from the camera.

The server 104 generates a depth map of a scene, ROI, or expanded ROI. For the example shown in FIG. 12, the overall depth of the scene may become lower because there is an object 20 (of a darker shade with an associated higher depth level value) that is closer to the camera than the object 22 (of a lighter shade with an associated lower value). The overall depth is the average or the minimum of the depth values of all pixels in the scene (or ROI, expanded ROI) of the video frame. Each pixel has an associated shade which in turn is associated with a depth level value. For this example, the overall depth of the scene gets lower during an occlusion event as objects that appear darker (with a lower associated depth level value) obstruct or occlude the objects of interest (with a higher associated depth level value).

For depth level analysis, in some example embodiments, the server 104 generates an expanded ROI for the object being tracked. The expanded ROI is defined by pixels of the video frame. The server 104 uses a depth model (e.g., the scale of shades and corresponding depth level values shown in FIG. 12) to compute the depth level value of each pixel of the expanded ROI. The server 104 aggregates the depth level values for the pixels to generate an overall depth level value for the video frame. The server 104 finds the object in the expanded ROI closest to the camera. The server 104 implements the depth level computation for adjacent video frames (e.g., the previous video frame and the current video frame) or other video frames for comparison. The server 104 compares the depth level value for the adjacent video frames (the previous video frame and the current video frame) to determine depth level variation (a reduction in the depth level value). The server 104 uses the determined depth level variation to determine occlusion events for the object of interest. In some example embodiments, a minimum of the depth level values can be used. In other example embodiments, there are different functions to compute the depth level value of the expanded ROI. The minimum depth level is one example depth level technique, but other functions can be used for other example embodiments, such as the expected depth level within the expanded ROI. As a simple example, the expected value can be the arithmetic average. As an advanced method, the depth level value can be averaged over a Gaussian function, of which the center of support is aligned with the center of the detected ROI. The underlying rationale is explained as follows. The object detection normally returns a rectangular region centered on the object of interest. Thus, it is reasonable to make the assumption that the depth level values of the pixels closer to the center of the detected ROI are more important. The Gaussian function can be applied to assign higher weights to the depth levels of those more important pixels.

Figure 13:
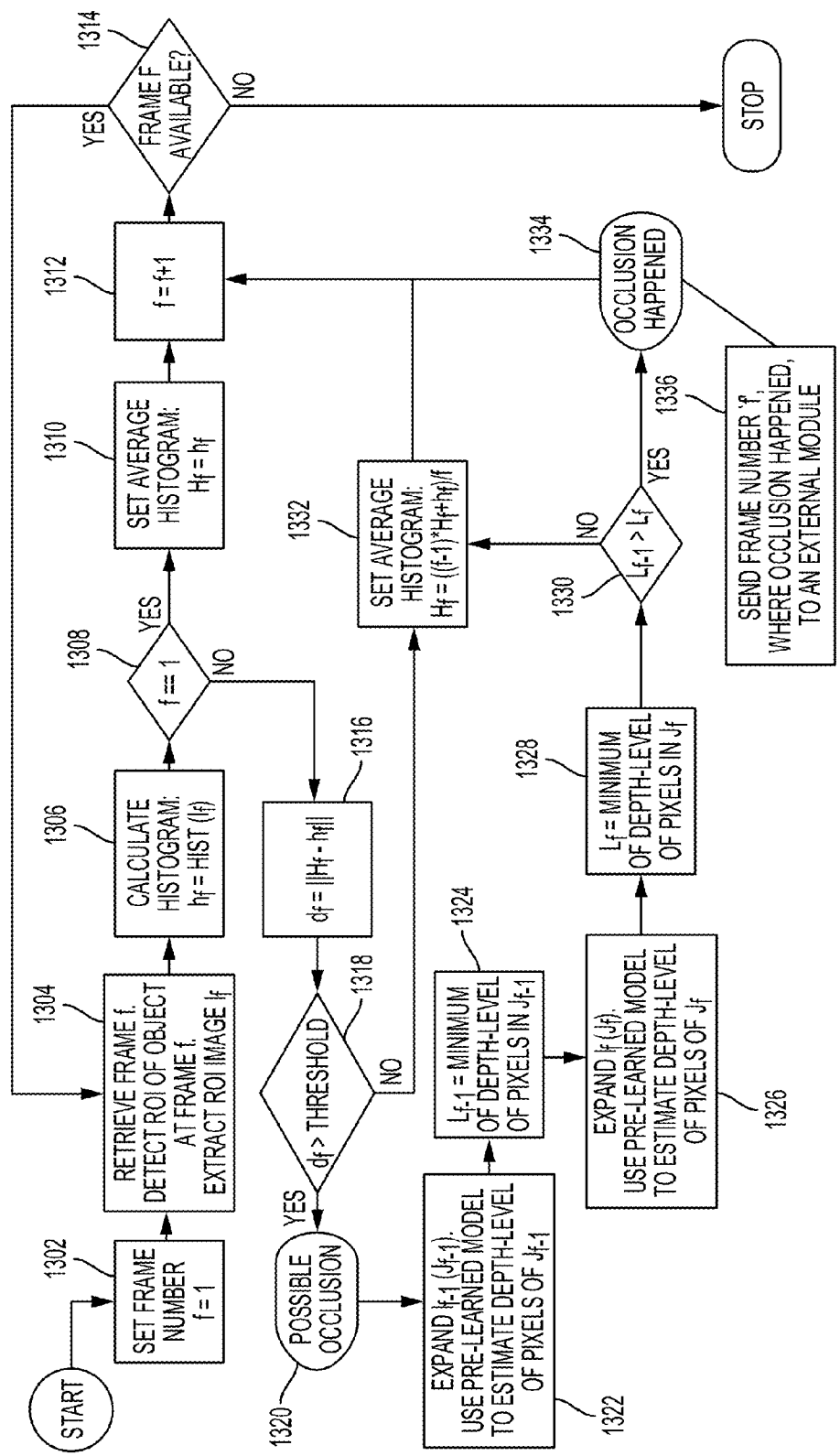
FIG. 13 illustrates is a diagram of an example process integrating histogram-based occlusion detection and depth-based occlusion detection to detect one or more occlusion events for an object of interest in video frames according to some embodiments.

FIG. 13 shows an example diagram of a process for occlusion detection according to some embodiments. For this illustrative example, the process will be described in relation to server 104. In some example embodiments, video camera system 304 (FIG. 5) implements aspects of the process. In other example embodiments, the process is implemented as an extension to a video processing software and hardware package, such as a stand-alone unit, as part of a cloud-based system, or in an extension library. For example, computer readable media with instructions for the process can be packaged as an extension or video analytics library that can be downloaded. Developers can use the application programming interface of the library for video processing applications. The video processing software and hardware package can include one or more cameras coupled to a hardware unit or server.

The system identifies an object to track using different tracking techniques. For example, an interface displaying the video frames may receive as input manual markups or drawings for an ROI that contains an object to track. As another example, the system pre-processes the video frames to identify all objects in one or more video frames, and receives a selection of one or more of the identified objects or otherwise selecting one or more of the identified objects for occlusion detection. In some examples, the system may implement occlusion detection for all identified objects without requiring selection.

At 1302, the server 104 sets the video frame index f to be the current frame for process (e.g., f=1 for the first video frame in the video data feed). Server 104 then sequentially processes the remaining video frames of the video data feed by incrementing the video frame index f at 1312.

At 1304, the server 104 retrieves the video frame at video frame index f from the video data feed for processing to detect occlusion events for the object of interest. The server 104 detects the ROI for the object of interest at video frame f and extracts the ROI image $I_f$. The server 104 may limit processing to the ROI instead of the entire video frame to use processing resources efficiently.

At 1306, the server 104 calculates histogram data for the extracted ROI of the object of interest $h_f$=hist($I_f$). The server 104 may calculate the histogram data using a color histogram, grey-scale histogram, or a histogram of gradient, for example. The server 104 can also calculate the histogram data using a histogram data for blocks of an image. An image can be decomposed or divided into small blocks, such that each block covers a small portion of the image. The server 104 determines representative blocks among the set of blocks and computes histogram data for the representative blocks.

At 1308, the server 104 determines whether the current video frame is the first video frame of the video data feed. If so, at 1310, the server 104 sets the average histogram value $H_f$ to be $h_f$ because there is no previous video frame histogram data to compare the current histogram data to. At 1312, the server 104 advances to the next video frame (video frame index f=f+1). At 1314, the server 104 determines if there are additional video frames available for processing to detect occlusion events and if so, the server returns to 1304 to retrieve an ROI for the new video frame. If not, the server 104 stops the process for occlusion detection and generates output data to identify the one or more frames that contain an occlusion of the object.

At 1316, if the server 104 determines that the current frame is not the first frame (f≠1) then the server 104 determines a histogram similarity metric $d_f=\|I_f-h_f\|$ for the current video frame and the previous video frame. The server 104 calculates the histogram similarity metric. The histogram similarity metric is an example of histogram variation.

At 1318, the server 104 determines whether the histogram similarity metric is greater than or equal to a threshold measurement value. As noted, the server 104 can determine the threshold measurement value via machine learning or a pre-defined configuration parameter. The server 104 calculates the threshold measurement value using various functions or processes, such as manual user configurations or automated machine learning techniques. For example, the threshold is initially set by a user configuration and is then adjusted using machine learning specific to the application and video type. The threshold value reduces false positives, which require processing resources for the depth analysis. The machine learning tunes or adjusts the threshold measurement value. There can be a pre-process of training using machine learning to set the threshold measurement value, which may be input to the server 104 for the occlusion detection process. The threshold measurement value can be static or dynamic in various example embodiments. An example machine learning process uses k nearest neighbour (kNN) to automatically set the threshold value. This machine learning kNN process can also apply to the depth threshold value.

If the server 104 determines that the histogram similarity metric is greater than or equal to a threshold measurement value at 1320, the server 104 detects one or more possible or potential occlusion events. At 1322, the server 104 implements the depth level variation process. In a particular embodiment, the server 104 expands the ROI $I_{f-1}$ to generate an expanded ROI $J_{f-1}$ for a pre-learned model to estimate the depth level of the pixels $J_{f-1}$. At 1324, the server 104 sets $L_{f-1}$ equal to the minimum of depth level of the pixels in $J_{f-1}$. At 1326, the server 104 uses the expanded ROI $J_f$ for a pre-learned model to estimate the depth level of pixels $J_f$. At 1328, the server 104 sets $L_f$ to the minimum of the depth level of pixels in $J_f$. At 1350, the server 104 compares $L_{f-1}$ to $L_f$. If the server 104 determines that $L_{f-1}$ is greater than (or equal to) $L_f$ then the server detects that an occlusion event has occurred in relation to the object of interest at 1334. In some example embodiments, the depth analysis is focused on the pixels for the ROI or an expanded ROI for the object being tracked in order to use processing resources efficiently, as compared to a depth analysis on the pixels for the entire video frame, for example.

At 1336, the server 104 sends output data to an external unit. The output data indicates the video frame at index f that contains the occlusion of the object. t. The output data can include the video frame at index f in some example embodiments.

If at 1330, the server 104 determines that $L_{f-1}$ is less than $L_f$, then at 1332 the server 104 sets the average histogram to $H_f=((f-1)*H_f+h_f)/f$ and proceeds to 1312 to advance to video frame f+1.

If at 1318, the server 104 determines that the histogram similarity is less than the threshold metric, then at 1332 the server 104 sets the average histogram to $H_f=((f-1)*H_f+h_f)/f$ and proceeds to 1312 to advance to video frame f+1. The server 104 continues until all video frames are processed. The server 104 generates output data based on the video frame processing. In some examples, the output data is generated in real-time with efficient use of processing resources. For example, the server 104 generates output data that identifies the first video frame in a series or sequence of video frames containing an occlusion of the object. There may be multiple series or sequences of video frames that contain an occlusion of the object. Further, there can be multiple occlusion events in a video frame in relation to the same object or different objects. In addition, there can be occlusions of objects over multiple video frames in relation to the same object or different objects.

As an illustrative example, video frame f1 can have an occlusion event for object A that continues until video frame f3, video frame f4 can have an occlusion event for object B that continues until video frame f5, video frame f6 may have another occlusion event for object A, and video frame f9 can have further occlusion events for both object A and object B. The process may identify the first video frame for each occlusion event as part of the output data. The output data can include an index or pointer to the video frame, or a copy of the video frames. The output data may undergo further processing, such as a complex tracking process for the video frames with detected occlusion events. The output data can be used to improve the performance of tracking processes to change behavior based on occlusions (e.g., to use a more sophisticated tracking technique for those video frames with detected occlusion events). Accordingly, the output data can trigger different processes for the video frames with detected occlusion events.

An object model can record tracking data for an object of interest. Embodiments described herein may provide a VBOT system that stops updating the object model of the object of interest when an occlusion is detected, to maintain the accuracy of the object model. The object model can be updated with incorrect or erroneous information due to occlusion events. The process can stop updates to the object model when occlusion is detected for those video frames. The process can store tracking information from ROIs for the object being tracked where there is no occlusion of the object being tracked. The system focuses on integrity of the object model to ensure high quality of tracking data.

Embodiments described herein provide a VBOT system that filters out incorrect ROIs detected during occlusion. The system uses ROIs to extract additional information for object tracking. When an occlusion event is detected in a video frame, the system can exclude the ROI with the occluded object from the video frame (e.g., ROIs with incorrect or partial views of the object) from feature extraction.

Embodiments described herein provide a VBOT system that switches to a (potentially more complex, sophisticated) tracking process which can better handle occlusion processing for VBOT when occlusion is detected. The complex tracking process uses increased processing resources. Instead of processing all video frames using the complex tracking process, its use may be limited to those video frames having a detected occlusion event (filtered based on occlusion event detection) to conserve processing resources.

Embodiments described herein provide a VBOT system that stops tracking the occluded object in video frames if an occlusion event is detected. After there are no more detected occlusion events in relation to the object being tracked, the VBOT system continues to detect and track the object in video frames. The VBOT system merges multiple tracks of a single object as a post-processing task. Generally, the system tries to track an object from start to end over the video frames. The system might not perform accurately if there is an occlusion event. Instead of using a more complex process which can increase processing resources, the system removes data related to video frames having an occlusion event and then stitches together video frames before and after the occlusion, for example.

Embodiments described herein may provide a VBOT system that uses the localization of an object in a video frame as an ROI for the object (e.g., rectangular bounding box surrounding the object of interest). This is an illustrative example shape for an ROI and other shapes may be used.

The proposed occlusion detection process can be combined with various tracking processes to enhance the tracking and make the tracking robust against object occlusion. The improved occlusion detection process may increase the accuracy of tracking, such as by using a more complex and accurate tracking process for the subset of video frames with detected occlusion events.

Embodiments described herein provide devices for video content analysis which relies on high accuracy object tracking. A tracking application may be for tracking people or other objects in indoor and outdoor surveillance videos. Another example tracking application is for tracking people and objects in sport videos. The occlusion detection process may have uses in various application domains to increase tracking accuracy.

Embodiments described herein use depth order for objects in a video frame and estimate depth for a subset of pixels for the ROI of the object being tracked instead of requiring, for example, an estimation for all pixels in a video frame. Embodiments described herein define a model or scale of depth level values for pixels in the ROI or expanded ROI for the object to determine the depth order for objects in the video frame. The depth level values may be known or estimated using a scale or model. Each object is defined by a set or collection of pixels. Each object has its own depth level value. The system uses this depth level information to determine the depth order for the objects in the video frame. Embodiments can involve manually labelling the depth of the objects in the images or video frames in order to generate the depth order, and using the depth order data to estimate the depth level values. Embodiments described herein can use absolute depth or depth order for the depth analysis.

Embodiments described herein identify the video frames in a video data feed, where some part of an object of interest (e.g., object being tracked) is invisible. It should be noted that the view of an object of interest in a video may be occluded several times in a video frame or series of video frames. Embodiments described herein identify all of the occlusion events or a portion thereof. Embodiments described herein use a two-stage occlusion detection based on histogram variation and depth level estimation The histogram-based detection involves an examination of the ROI of each object for potential occlusion, which may result in false positives (a video frame flagged as having a detected occlusion event but not actually having an occlusion event) because histogram variation may result from events other than occlusion. The relatively more computationally intensive depth-based detection analysis aims at a further screening of the candidate video frames of the occlusion event, only processing the ROIs (or expanded ROIs) that pass the first examination (e.g., histogram variation).

Existing approaches either rely on accurate object segmentations from videos or may not effectively handle the situation where a moving object is occluded by some object of the static background. Embodiments described herein rely on the localization of an object in a video frame as an ROI or an expanded ROI of the object (e.g., a rectangular bounding box surrounding the object of interest). Other shapes may be used to define the ROI or expanded ROI in other example embodiments. In addition, embodiments described herein use depth level information to detect occlusion with accuracy.

The embodiments of the devices, systems and methods described herein can be implemented in a combination of both hardware and software. These embodiments can be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface can be a network communication interface. In embodiments in which elements can be combined, the communication interface can be a software communication interface, such as those for inter-process communication. In still other embodiments, there can be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein provide solutions for improved video processing that may limit the use of more complex tracking methods for the subset of the video frames where an occlusion is detected. The embodiments provide increased accuracy for tracking data by identifying occlusion events and stopping the tracking data collection process when an occlusion is detected (as tracking data may be erroneous due to occlusions). The embodiments stop updating the object models when an occlusion is detected for data integrity. The embodiments provide for better memory usage by only storing a subset of the video frames, and improved bandwidth usage by only transmitting a subset of the video frames for further processing when an occlusion is detected.

The following discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" can include both direct coupling (in which two elements that are coupled to each other contact each other) and indirect coupling (in which at least one additional element is located between the two elements).

The technical solution of embodiments can be in the form of a software product. The software product can be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses. The embodiments described herein have no meaning or practical applicability outside their use with computer hardware, machines, and various hardware components. Substituting the physical hardware particularly configured to implement various acts for non-physical hardware, using mental steps for example, substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein can be utilized. Accordingly, the appended claims are intended to include within their scope such processes, machines, manufacture, compositions of matter, means, methods, or steps.

As can be understood, the examples described herein and illustrated are intended to be examples only.

What is claimed is:

1. A process for occlusion detection for video-based object tracking (VBOT) comprising:
   processing a first video frame to compute first histogram data and first depth level data for a region of interest (ROI) of the first video frame, the ROI of the first video frame including an object being track that is not occluded;
   processing a second video frame to compute second histogram data for a ROI of the second video frame, the ROI of the second video frame including the object;
   comparing the first histogram data and second histogram data by computing a histogram variation and comparing the histogram variation to a histogram threshold measurement value;
   after determining that the histogram variation is greater than the histogram threshold measurement value:
   processing the second video frame to compute second depth level data for the ROI of the second video frame;
   comparing the first depth level data and the second depth level data to compute a depth level variation;
   determining that the second video frame contains occlusion of the object by determining that the depth level variation is greater than a depth threshold measurement value;
   transmitting output data that indicates the second video frame contains occlusion of the object.

2. The process of claim 1 wherein processing the first video frame to compute the first histogram data comprises detecting the object being tracked, and defining the ROI of the first video frame.

3. The process of claim 1 wherein computing the histogram variation comprises determining a similarity of two histogram vectors for each of the first histogram data and second histogram data, the histogram vector for the first histogram data representing a distribution of color values of pixels for the first video frame or the ROI of the first video frame, the histogram vector for the second histogram data representing a distribution of color values of pixels for the second video frame or the ROI of the second video frame.

4. The process of claim 1 wherein the first depth level data is computed by processing ROI or an expanded ROI of the first video frame to compute depth level values for pixels of the ROI or expanded ROI of the first video frame, and wherein the first depth level data is computed based on the depth level values for the pixels.

5. The process of claim 1 further comprising updating an average histogram value based on the first histogram data and second histogram data, the histogram threshold measurement value being based on the average histogram value.

6. The process of claim 1 wherein the first depth level data is a value that represents a closeness of the ROI for the first video frame to a camera and the second depth level data is a value that represents a closeness of the ROI for the second video frame to the camera.

7. The process of claim 1 further comprising tracking the object by defining the ROI of the first video frame and ROI of the second video frame and computing the first histogram data and the second histogram data using the ROI of the first video frame and the ROI of the second video frame.

8. The process of claim 7 comprising processing a first expanded ROI based on the ROI of the first video frame and a second expanded ROI based on the ROI of the second video frame and computing the first depth level data by estimating a depth-level value based on the expanded ROI and computing the second depth level data by estimating a depth-level value based on the second expanded ROI.

9. The process of claim 1 wherein the output data comprises an index for the second video frame or a copy of the second video frame.

10. A device for occlusion detection for video-based object tracking (VBOT) comprising:
    a transceiver receiving video frames for tracking an object;
    a processor configured to:
    process a first video frame to compute first histogram data and first depth level data for a region of interest (ROI) of the first video frame, the ROI of the first video frame including an object being track that is not occluded;
    process a second video frame to compute second histogram data for a ROI of the second video frame, the ROI second video frame including the-object;

compare the first histogram data and second histogram data by computing a histogram variation and comparing the histogram variation to a histogram threshold measurement value;

after determining that the histogram variation is greater than the histogram threshold measurement value:
process the second video frame to compute second depth level data for the ROI of the second video frame;
compare the first depth level data and the second depth level data to compute a depth level variation;
determine that the second video frame contains occlusion of the object by determining that the depth level variation is greater than a depth threshold measurement value; and
generate output data that indicates that the second video frame contains occlusion of the object; and a data storage device for storing the output data.

11. The device of claim 10 wherein the processor is configured to process the first video frame to compute the first histogram data by detecting the object being tracked, defining the ROI of the first video frame.

12. The device of claim 10 wherein the processor is configured to compute the histogram variation by determining a similarity of two histogram vectors for each of the first histogram data and second histogram data, the histogram vector for the first histogram data representing a distribution of color values of pixels for the first video frame or the ROI of the first video frame, and the histogram vector for the second histogram data representing a distribution of color values of pixels for the second video frame or the ROI of the second video frame.

13. The device of claim 10 wherein the processor is configured to compute the first depth level data is computed by processing the ROI or an expanded ROI of the first video frame to compute depth level values for pixels of the ROI or expanded ROI of the first video frame, and wherein the first depth level data is computed based on the depth level values for the pixels.

14. The device of claim 10 wherein the processor is configured to update an average histogram value based on the first histogram data and second histogram data, the histogram threshold measurement value being based on the average histogram value.

15. The device of claim 10 wherein the first depth level data is a value that represents a closeness of the ROI for the first video frame to a camera and the second depth level data is a value that represents a closeness of the ROI of the second video frame to the camera.

16. The device of claim 10 wherein the processor is configured to track the object by defining the ROI of the first video frame and the ROI of the second video frame and computing the first histogram data and the second histogram data using the ROI of the first video frame and the ROI of the second video frame.

17. The device of claim 10 wherein the processor is configured to process a first expanded ROI based on the ROI of the first video frame and a second expanded ROI based on the ROI of the second video frame and computing the first depth level data for the object second depth level data for the object by estimating a depth-level value based on the expanded ROIs of the object.

18. A system for occlusion detection for video-based object tracking (VBOT) comprising:
one or more cameras to capture video frames for tracking an object;
a processor configured to:
process a first video frame to compute first histogram data and first depth level data for a region of interest (ROI) of the first video frame, the ROI of the first video frame including an object being track that is not occluded;
process a second video frame to compute second histogram data for a ROI of the second video frame, the ROI second video frame including the object;
compare the first histogram data and second histogram data by computing a histogram variation and comparing the histogram variation to a histogram threshold measurement value;
after determining that the histogram variation is greater than the histogram threshold measurement value:
process the second video frame to compute second depth level data for the ROI of the second video frame;
compare the first depth level data and the second depth level data to compute a depth level variation;
determine that the second video frame contains the occlusion of the object by determining that the depth level variation is greater than a depth threshold measurement value; and
generate output data that indicates that the second video frame contains the occlusion of the object; and
a display device to display a visual representation of the output data or the second video frame.

19. The process of claim 1 wherein the second depth level data is computed by processing the ROI or an expanded ROI of the second video frame to compute depth level values for pixels of the ROI or the expanded ROI of the second video frame, and wherein the second depth level data is computed based on the depth level values for the pixels.

20. The device of claim 10 wherein the second depth level data is computed by processing the ROI or an expanded ROI of the second video frame to compute depth level values for pixels of the ROI or the expanded ROI of the second video frame, and wherein the second depth level data is computed based on the depth level values for the pixels.

21. The system of claim 18, wherein the processor is configured to compute the histogram variation by determining a similarity of two histogram vectors for each of the first histogram data and second histogram data, the histogram vector for the first histogram data representing a distribution of color values of pixels for the first video frame or the ROI of the first video frame, and the histogram vector for the second histogram data representing a distribution of color values of pixels for the second video frame or the ROI of the second video frame.

22. The system of claim 18, wherein the processor is configured to compute the first depth level data is computed by processing the ROI or an expanded ROI of the first video frame to compute depth level values for pixels of the ROI or expanded ROI of the first video frame, and wherein the first depth level data is computed based on the depth level values for the pixels.

23. The system of claim 18, wherein the processor is configured to update an average histogram value based on the first histogram data and second histogram data, the histogram threshold measurement value being based on the average histogram value.

24. The system of claim 18 wherein the second depth level data is computed by processing the ROI or an expanded ROI of the second video frame to compute depth level values for pixels of the ROI or the expanded ROI of the second video frame, and wherein the second depth level data f is computed based on the depth level values for the pixels.

* * * * *